Aug. 2, 1932.  R. MURPHY ET AL  1,869,575
CRANK CASE VENTILATING MEANS FOR INTERNAL COMBUSTION ENGINE
Filed May 12, 1926

Patented Aug. 2, 1932

1,869,575

UNITED STATES PATENT OFFICE

RALPH MURPHY AND EDWARD S. MARKS, OF SYRACUSE, NEW YORK, ASSIGNORS, BY MESNE ASSIGNMENTS, TO FRANKLIN DEVELOPMENT CORPORATION, OF SYRACUSE, NEW YORK, A CORPORATION OF NEW YORK

CRANK CASE VENTILATING MEANS FOR INTERNAL COMBUSTION ENGINES

Application filed May 12, 1926. Serial No. 108,476.

The invention has for its object a particularly simple and efficient means for ventilating the crank case of an internal combustion engine, whether such engine is equipped with an air cooling system or a water cooling system, which crank case ventilating means is particularly simple and economical in construction and highly efficient in use and which adds very little to the engine construction.

This invention consists in the novel features and in the combinations and constructions hereinafter set forth and claimed.

In describing this invention reference is had to the accompanying drawing in which like characters represent corresponding parts in all the views.

This invention comprises, generally, an intake pipe and outlet pipe communicating with the crank case above the oil level therein and means for creating a current of air through the intake and the outlet pipe and through the crank case, the intake and outlet pipes being remote from each other and preferably located at opposite ends of the crank case, so that the current of air created travels practically the entire length and width of the crank case.

Figure 1:
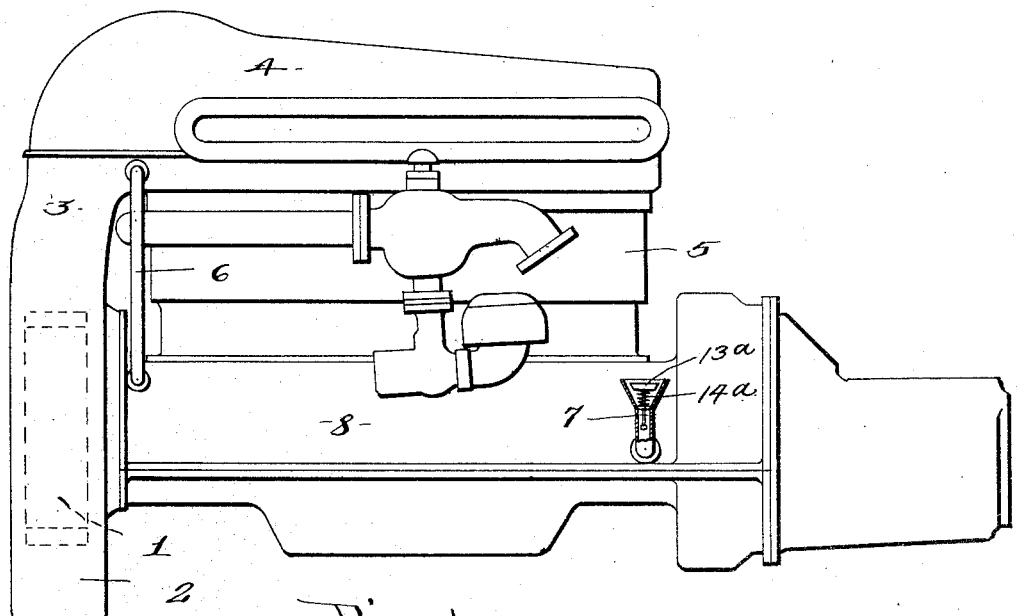
Figure 1 is a side elevation of an engine provided with an air cooling system equipped with our invention.

In Figure 1 an air cooled engine is shown provided with an air cooling system including a fan 1 mounted on the crank shaft, a fan casing 2 having an upwardly extending outlet 3 and an air conduit 4 communicating with the upper end of the fan outlet 3 and extending over the heads of the cylinders, and communicating with jackets 5 surrounding the cylinders. The fan 1 may be a suction fan or a blower. It is usually a blower as in the engine used in the well known Franklin automobile.

6 is the inlet pipe for the air, and 7 the outlet or breather pipe, the pipe 6 connecting the air conduit 4 and the crank case 8 near the front end of the crank case and the outlet or breather pipe 7 being located at the rear end of the crank case.

Obviously the pressure in the air conduit 4 will create a draft through the intake pipe 6, the crank case 8 and outlet or breather pipe 7.

In case the fan is a suction fan so that the air is drawn upwardly through the lower ends of the jackets 5 into the air conduit 4 and blown out through the fan casing, suction will be created in the pipe 6 so that the air is drawn in through the pipe 7, the crank case 8 and out through the pipe 6 into the air conduit and crank casing.

Figure 2:
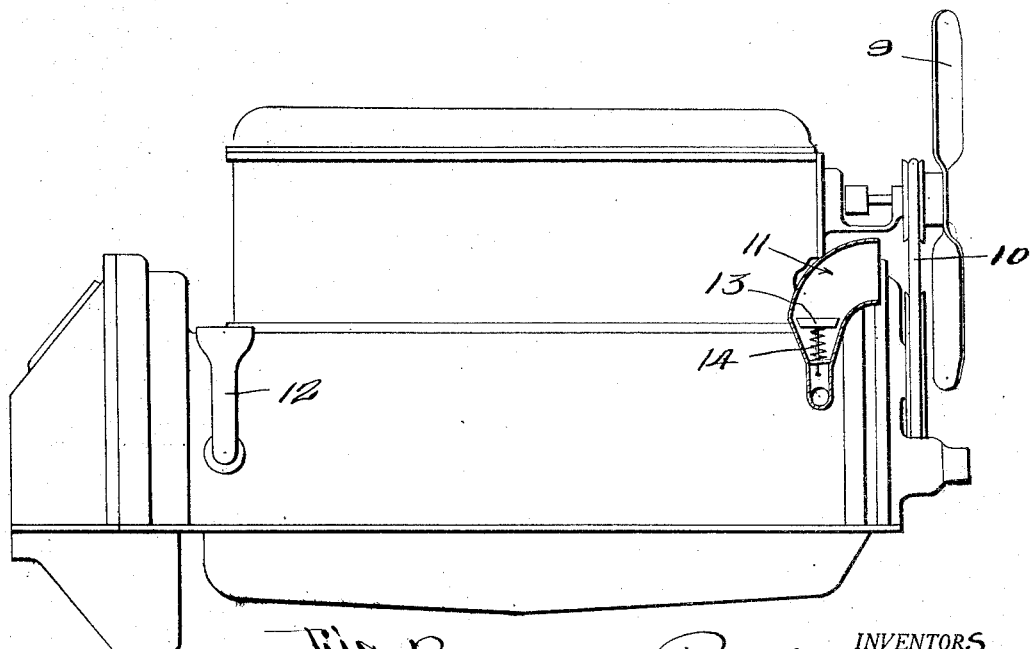
Figure 2 is a side elevation of a water cooled engine equipped with our invention.

In Figure 2 a water cooled engine is shown in which the cooling system includes the usual fan 9 driven by the engine by means of a belt 10, this fan 9 being usually arranged in the rear of the radiator.

11 is the intake pipe and 12 the outlet or breather pipe, the intake pipe 11 being presented toward the fan 9 so as to receive a current of air therefrom.

In Figure 2, a valve 13 is shown which is held open by a spring 14 and which is moved towards its seat more or less as the pressure increases so that the cooling effect is restrained as the speed of the fan increases. A similar valve $13^a$ may be located in the pipe 7, Figure 1, to be operated by atmospheric pressure against a spring $14^a$ when the suction created by the fan 1 is sufficient so that the outside pressure will close or partly close the valve.

This crank case ventilating means is particularly advantageous in that it provides for the ventilating of the crank case and the removal of vapors therefrom without adding materially to the engine construction and it also provides a particularly simple means for preventing dilution of the crank case oil due to condensation of vapors in the crank case particularly water.

What we claim is:—

1. In an internal combustion engine having an air cooling system consisting of a fan at one end of the engine, a fan casing and an air conduit discharging onto the heads of the cylinders of the engine and communicating with the fan casing, a pipe connecting the air conduit and one end of the crank case and a pipe leading from the other end of the crank case into the outer air, and a normally-open, pressure-operated, spring-pressed valve in one of said pipes.

2. An internal combustion engine having a cooling system including a fan at one end of the engine, crank case cooling means comprising an inlet at one end of the crank case arranged to receive a portion of the air current created by the fan and an outlet at the other end of the crank case, one of said conduits being provided with a pressure operated cut-off valve therein.

In testimony whereof we have hereunto signed our names, at Syracuse, in the county of Onondaga, and in the State of New York, this 5th day of May, 1926.

RALPH MURPHY.
EDWARD S. MARKS.